(12) United States Patent
Kates et al.

(10) Patent No.: US 9,304,647 B1
(45) Date of Patent: Apr. 5, 2016

(54) USER INTERFACE SCREEN PRESENTATION PRIORITIZATION

(75) Inventors: Jesse Kates, Kansas City, MO (US); Harry Lai, Overland Park, KS (US); Kristen Miller, Chicago, IL (US); Christine Denise Schumaker, Lenexa, KS (US); Balaji S. Thenthiruperai, Prairie Village, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 446 days.

(21) Appl. No.: 13/612,819

(22) Filed: Sep. 12, 2012

Related U.S. Application Data (63) Continuation of application No. 12/480,677, filed on Jun. 8, 2009, now Pat. No. 8,347,228.

(51) Int. Cl.
  *G06F 3/048* (2013.01)
  *G06F 3/0481* (2013.01)
  *G06F 3/0482* (2013.01)
  *G06F 3/01* (2006.01)
  *G06F 3/0489* (2013.01)

(52) U.S. Cl.
  CPC ............ *G06F 3/0481* (2013.01); *G06F 3/0482* (2013.01); *G06F 3/04895* (2013.01)

(58) Field of Classification Search
  CPC .......... G06F 17/30867; G06F 17/3089; G06F 17/30058; G06F 17/3053; G06F 17/30539; G06F 3/1204; G06F 3/0484; G06F 3/04842
  USPC ......................................... 715/821; 709/246
  See application file for complete search history.

(56) References Cited

U.S. PATENT DOCUMENTS

| | | | |
|---|---|---|---|
| 5,179,708 A | 1/1993 | Gyllstrom et al. | |
| 5,327,117 A | 7/1994 | Kohsaka | |
| 6,147,977 A * | 11/2000 | Thro et al. | 370/265 |
| 6,658,409 B1 | 12/2003 | Nomura et al. | |
| 7,257,777 B1 * | 8/2007 | Kanevsky et al. | 715/794 |
| 2004/0070627 A1 | 4/2004 | Shahine et al. | |
| 2005/0140574 A1 * | 6/2005 | Tamura | G06F 1/1616 345/9 |
| 2006/0206573 A1 * | 9/2006 | Horvitz et al. | 709/206 |
| 2006/0235842 A1 * | 10/2006 | Szekely et al. | 707/5 |
| 2008/0062318 A1 * | 3/2008 | Ellis et al. | 348/564 |
| 2009/0147780 A1 * | 6/2009 | Guo et al. | 370/389 |
| 2010/0199184 A1 * | 8/2010 | Horowitz | G06Q 50/01 715/733 |
| 2012/0271819 A1 * | 10/2012 | Qiu et al. | 707/723 |
| 2013/0073400 A1 * | 3/2013 | Heath | 705/14.73 |
| 2013/0218885 A1 * | 8/2013 | Satyanarayanan | 707/728 |

OTHER PUBLICATIONS

Kates, Jesse., et al., Patent Application entitled, "User Interface Screen Presentation Prioritization", filed Jun. 8, 2009, U.S. Appl. No. 12/480,677.

(Continued)

*Primary Examiner* — Nicholas Augustine
*Assistant Examiner* — Andres E Gutierrez (57) ABSTRACT

A system and method for user interface screen presentation prioritization is provided. The display of a plurality of panes may be determined based on either priorities of each pane received in messages or based on combined weightings of each pane based on a weighting provided by a user and a weighting provided by a content source. The display of the panes may relocate the panes and/or change the size of the panes based on changed priorities of each pane or based on changed combined weighting of each pane. The panes may comprise selectable items.

20 Claims, 6 Drawing Sheets

(56) References Cited

OTHER PUBLICATIONS

Office Action dated Jun. 22, 2011, U.S. Appl. No. 12/480,677, filed Jun. 8, 2009.

Final Office Action dated Dec. 14, 2011, U.S. Appl. No. 12/480,677, filed Jun. 8, 2009.

Notice of Allowance dated Aug. 17, 2012, U.S. Appl. No. 12/480,677, filed Jun. 8, 2009.

* cited by examiner

USER INTERFACE SCREEN PRESENTATION PRIORITIZATION

CROSS-REFERENCE TO RELATED APPLICATIONS

This application is a continuation of and claims priority under 35 U.S.C. §120 to U.S. patent application Ser. No. 12/480,677, filed on Jun. 8, 2009, entitled "User Interface Screen Presentation Prioritization," by Jesse Kates, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Widgets are small interactive software applications embedded into electronic devices that may link a device to external sources of content. Devices display an interface of the widgets and content received by the widgets. Widgets may be installed and executed within a web page. Further, widgets may be embedded in any of a desktop computer, a laptop computer, a tablet computer, a set-top box, a kiosk, a mobile phone, a personal digital assistant (PDA), a media player, and other electronic devices. Users may download and install widgets from providers of content. Widgets may alternatively be created by a user. As freestanding bundles of software code that may run independently of the web page in which they are embedded, widgets may be added to already existing web pages to enhance the appeal of web pages. As packaged applications, widgets may be readily shared by users and transported in a variety of manners. Examples of widgets include simple clocks, stock market tracking tickers, news broadcasters, weather information providers, sports score providers, and games. More complex widgets can gather information from a variety of sources and present the information to users in interesting and useful ways. Widgets may save content locally or may display a constant stream of media received from network sources.

SUMMARY

In an embodiment, a user interface screen presentation prioritization system is provided. The system comprises an electronic communication device and an application, that when executed on the personal electronic communication device, receives a first message containing a first priority associated with a first selectable item of a display screen of the electronic communication device, a second priority associated with a second selectable item of the display screen, and a third priority associated with a third selectable item of the display screen. The system also positions the first selectable item, the second selectable item, and the third selectable item in the display based on the first priority, the second priority, and the third priority. The system also receives a second message indicating a change in the first priority and changes the displayed size of the first selectable item. The system also relocates the second selectable item and the third selectable item in the display to adjust for the change to the displayed size of the first selectable item.

In another embodiment, a processor-implemented method of user interface screen presentation prioritization is provided. The method comprises an electronic device receiving a first weight associated with a first selectable item, a second weight associated with a second selectable item, and a third weight associated with a third selectable item from a first interested party. The method also comprises the electronic device receiving a fourth weight associated with the first selectable item from a second interested party, receiving a fifth weight associated with the second selectable item from a third interested party, and receiving a sixth weight associated with the third selectable item from a fourth interested party. The method also comprises the electronic device combining the first weight with the fourth weight to determine a first combined weight, combining the second weight with the fifth weight to determine a second combined weight, and combining the third weight with the sixth weight to determine a third combined weight. The method also comprises the electronic device positioning the first selectable item, the second selectable item, and the third selectable item in the display based on the first combined weight, the second combined weight, and the third combined weight.

In another embodiment, a processor-implemented method of user interface screen presentation prioritization is provided. The method comprises an electronic device combining a first weight with a fourth weight to determine a first combined weight, combining a second weight with a fifth weight to determine a second combined weight, and combining a third weight with a sixth weight to determine a third combined weight, the first weight and the fourth weight associated with a first selectable object, the second weight and the fifth weight associated with a second selectable object, and third weight and the sixth weight associated with a third selectable object, the first, second, and third weights received from a first interested party, the fourth weight received from a second interested party, the fifth weight received from a third interested party, and the sixth weight received from a fourth interested party. The method also comprises the electronic device positioning the first selectable item, the second selectable item, and the third selectable item in a display of the electronic device based on the first combined weight, the second combined weight, and the third combined weight. The method also comprises the electronic device receiving a message from the second interested party, the message containing a seventh weight associated with the first selectable item, the seventh weight replacing the fourth weight. The method also comprises the electronic device combining the first weight with the seventh weight to determine a fourth combined weight and the electronic device changing the display size of the first selectable item in response to the determination of the fourth combined weight. The method also comprises the electronic device relocating the second selectable item and the third selectable item in the display to permit the change in display size of the first selectable item.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Several embodiments of a widget prioritization system permit a device to display electronic widgets in a prioritized manner with the widgets potentially changing in appearance as content updates are received. When a content source provides an important update or an alert, the widget associated with the content may temporarily expand in size, change color, or display a different image. The other widgets in the display may be temporarily reduced in size. In an embodiment, the widgets that are reduced in size may be displaced on the display to an outer edge while maintaining their relative position. For example, a widget displayed in the lower left corner of the display may be reduced in size but remain in the lower left corner of the display.

Prioritization of widgets describes the general importance assigned by users to content delivered through widgets. A higher prioritization may be assigned by a user, for example, to a widget delivering stock market alerts than a widget delivering sports news updates. The general importance assigned to a widget and/or the content presented by the widget by a user may be subjective. For example, a first user may place a higher general importance on a widget delivering stock quote content than on a widget delivering sports scores content, while a second user may place a higher general importance on the widget delivering sports scores content than on the widget delivering stock quote content. The initial positioning and sizing of widgets in a display associated to a user, for example a display of a mobile phone or a display of a desktop computer associated with the user, may reflect these priorities assigned by the user. A content provider delivering information updates to widgets may additionally provide weights to specific content provided. The content provider may make a determination of the importance or criticality of an item of content, for example a change in a stock price, an update to a sports score, or a weather event. The initial general priority weighting by a user of the overall importance of the subject matter accessible from a widget is combined with the provider's weighting of a specific item of content the provider is delivering via the widget. The present disclosure teaches the temporary expansion or other changing of color of widgets to call attention to alert conditions. The present disclosure also teaches the balancing of more than one alert or heightened condition in need of attention while maintaining accessibility to other widgets remaining in a normal state.

Portable electronic devices such as mobile telephones are limited in size and may not be able to display all widgets in a single view, particularly when widgets may temporarily expand in size. In an embodiment, the present disclosure teaches the maintaining of the originally chosen widget positioning, even when some widgets change in size and temporarily move partially or completely from the primary display area of the device. Maintaining relative positioning of all widgets regardless of temporary size or other changes in one or several widgets may allow widgets that have temporarily moved from view to be more easily located. Indicators such as small arrows in the margins of the display may point to the location of a widget that has moved from immediate view. A temporarily moved widget may be accessed by scrolling across to the appropriate panel and finding the widget there. It may be possible to determine the direction in which a widget has been moved by knowing that relative positioning of widgets has not changed and by using indicators that point to the present locations of temporarily moved widgets.

In one embodiment, the present disclosure teaches the combining of semi-permanent, general subject matter weightings by users of widgets with short-term weightings of items of content by the providers of content associated with those widgets. A widget providing a low general importance but temporarily subject to a high alert may at a particular moment be roughly equivalent in size to a widget always of high interest providing routine information at that time. A balancing of a plurality of these user/provider combinations is taught, with the user in embodiments specifying the general importance of an area of subject matter and content providers rating the importance of specific items of content as they become available. In an embodiment, the input of additional parties may be used to contribute to the determination of a combined or composite value for an item of content. A group of content consumers could vote and provide consensus ratings of the importance of an item of content. The importance of the content could alternatively be measured by the sheer volume of interest in an item of news, business, sports, or weather content, for example, without consumers' active participation. The primary actors in the events themselves also may provide ratings, evaluations, or alert levels associated with events occurring in which they are participants or eye-witnesses. The collective ratings and input of groups of interested observing parties and the ratings of parties directly involved in the events themselves may be quantified and made additional factors in the overall calculation of the importance of content delivered via widgets.

Figure 1:
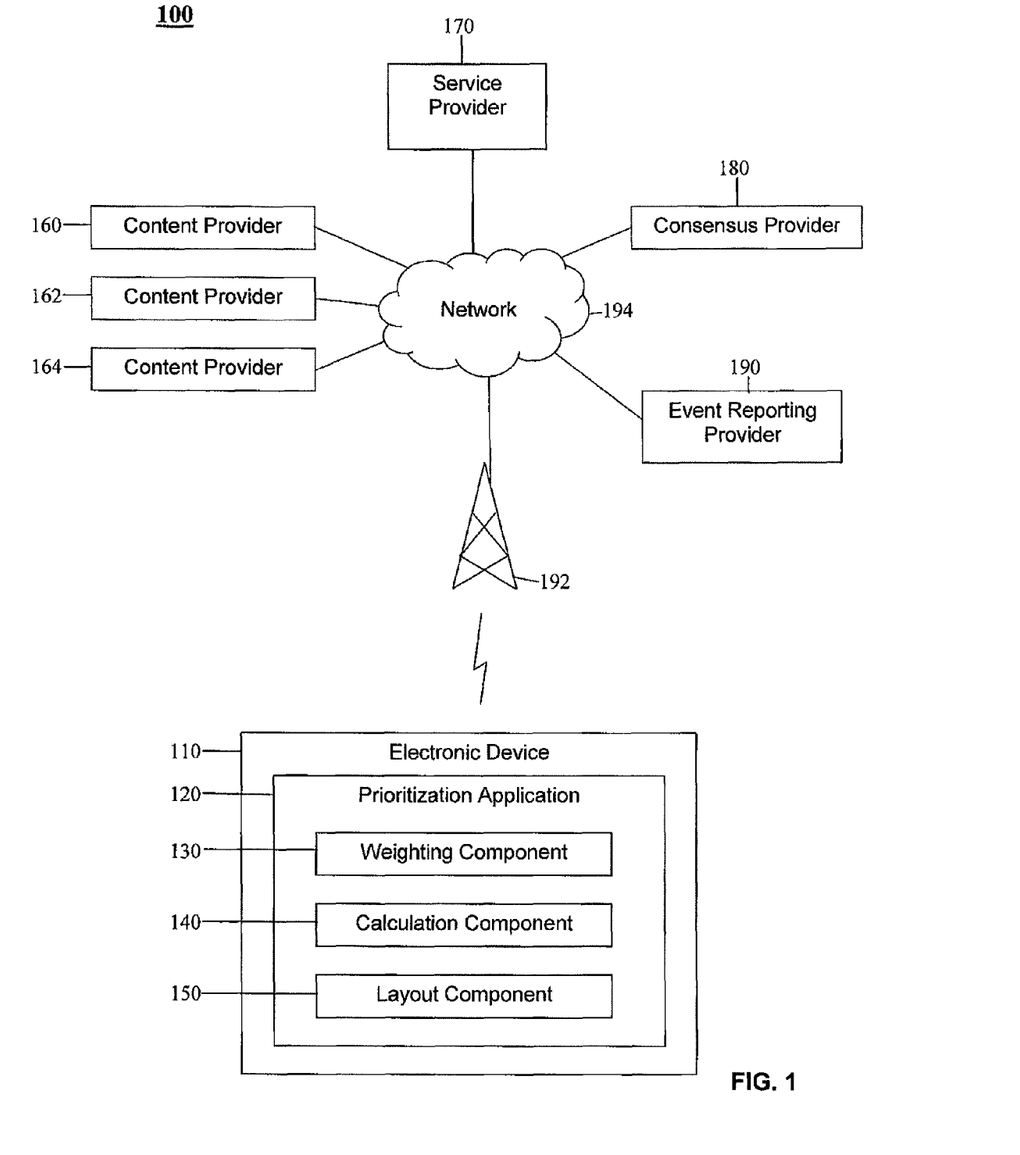
FIG. 1 is a block diagram of a system according to an embodiment of the disclosure.

Turning now to FIG. 1, a system 100 of widget prioritization is provided. The system 100 comprises an electronic device 110, a prioritization application 120, a weighting component 130, a calculation component 140, a layout component 150, content providers 160, 162, 164, a service provider 170, a consensus provider 180, an event reporting provider 190, a base transceiver system 192, and a network 194.

The electronic device 110 is a communications device that receives electronic content from content providers 160, 162, 164. The electronic device 110 may be a mobile telephone used under a subscription plan or other services arrangement with a service provider 170. Under a plan, the electronic device 110 may receive a plurality of electronic content, including updates of periodically refreshed information from content providers 160, 162, 164. The electronic device 110 may receive and display this information through widgets installed on the electronic device 110. Widgets are resident software applications embedded into the electronic device 110 that may receive information from external sources, for example content providers 160, 162, 164. In an embodiment, the electronic device 110 may download, install, and configure widgets from content providers 160, 162, 164 or other sources. Widgets may be queried for any configuration requirements or preferences they may have regarding sizing or placement in the display of the electronic device 110. The electronic device 110 may host a plurality of other applications that are not widgets including the prioritization application 120. The electronic device 110 also may be a personal digital assistant (PDA), a media player, a laptop computer, a tablet computer, a desktop computer, a kiosk, a set-top box, a television, a video game console, and other electronic devices.

The prioritization application 120 executes on the electronic device 110 and receives general priority weightings of widgets from users. The general priority weightings of widgets establish the general importance to a user associated with the subject matter provided by a widget. On a scale of 10, a widget providing stock market prices may be given a general priority weighting of 7 and a widget providing weather updates may be given a general priority weighting of 3, for example. The prioritization application 120 combines a user's general priority weightings of widgets with weightings associated with short-lived items of content associated with specific widgets. The weightings may be provided by content providers 160, 162, 164. In an example, a content provider 160 that provides stock market updates may send a message to an associated widget executing on an electronic device 110, the message including an updated price to a particular common stock issue. At a time of great market fluctuation or when interest in the particular common stock is very high, the message including the updated price may be provided a high urgency. The high urgency may be assigned a specific weight by the content provider 160, for example a weight of 9 on a scale of 10. The specific weight of 9 may be combined in some algorithm or other fashion with the general priority weighting of 7 previously provided by the user of the electronic device 110 for stock market prices in general.

The product of 63 or some other arithmetic or formulaic result may be used in determining a temporary resizing or other changing of the appearance of the widget associated with stock market activity. Based on its calculated values and the comparisons of values calculated for widgets associated with heightened conditions with values calculated for widgets associated with normal conditions, the prioritization application 120 may also temporarily adjust the size, appearance, and location of other widgets not currently associated with heightened conditions to permit the expansion of the affected widget. The prioritization application 120 may temporarily move the other non-affected widgets partially or completely from the primary viewing area of the electronic device 110 while maintaining their relative position to each other and the affected widget. The prioritization application 120 may provide indicators of the changed locations of the non-affected widgets during the time the alert condition is in effect for the affected widget.

The prioritization application 120 comprises the weighting component 130 that receives the general priority weightings that are assigned by a user to each widget. These general priority weightings indicate the overall importance of the subject matter associated with each widget. In an embodiment, the general priority weightings of widgets may be established initially and may change occasionally. An electronic device 110 may be configured with one set of general priority weightings for the daytime and another for the evening and/or one set of general priority weightings during the workweek and another in effect on the weekend. The weighting component 130 also receives event weightings associated with the short-lived items of content associated with events tracked by content providers 160, 162, 164. The weighting component 130 stores the event weightings received at various times along with the general priority weightings associated with the widgets that receive the event weightings. The weighting component 130 stores the event weightings for use by the calculation component 140 and the layout component 150 and may discard the event weightings when the alert conditions associated with the event weightings are no longer in effect.

The prioritization application 120 also comprises the calculation component 140 that performs arithmetic and formulaic operations on combinations of general priority weightings and their associated event weightings. In the simple example previously provided, a general priority weighting may be a rating on one scale and an event weighting may be a rating on another scale. In the example, adjustments to the size or other aspect of a particular widget may be determined by calculating the product of the two ratings. The calculation component 140, instead of calculating a simple product by multiplying the general priority weighting in effect for a widget with the event weighting provided by a content provider 160 for a specific current content item, may process the two weightings through an algorithm. The algorithm may calculate relative priority values of widgets, including widgets presently associated with various levels of heightened conditions as well as widgets associated with normal conditions.

In an embodiment, two or more widgets may be simultaneously subject to heightened conditions. In an example, a tornado warning may be sent by a content provider 160 specializing in weather reporting at about the same time that a certain listed stock of interest increases in value by a material amount, for example 10%, and this event is reported by content provider 162. In this example, new event weightings are received from both the content provider 160 and the content provider 162. The calculation component 140 would calculate new composite or combined weights for both the widget associated with weather reporting and the widget associated with stock market reporting. The calculation component 140 may also perform additional calculations involving other widgets not presently associated with heightened conditions as their presentation and positioning may be affected by changes to the two or more widgets temporarily subject to heightened conditions. In an embodiment, widgets may be changed for a short duration, for example ten or twenty minutes, while a heightened condition is in effect.

The prioritization application 120 also comprises the layout component 150 that receives input from the calculation component 140. The layout component 150 makes changes to the sizing and appearance of widgets in response to the calculations about heightened conditions communicated by content providers 160, 162, 164. The layout component 150 makes the determinations of how widgets should be visually projected in the display of the electronic device 110. The layout component 150 deals with the physical limitations of the electronic device 110 in displaying widgets based on the preferred positioning of widgets that may have been expressed by a user and based on calculations made by the calculation component 140. The layout component 150 also deals with display limitations associated with specific widgets. It may not be possible to change the shape or color of some widgets. Some widgets may have technical or legal limitations regarding the size to which the widget may be reduced or expanded. Because some widgets may be obtained from content providers 160, 162, 164, and installed under agreement with the content providers 160, 162, 164, use of the widgets may be subject to requirements that limit how the size and appearance may be changed. Some widgets may display images that a user cannot change and require that the widget remain a certain size or color. The layout component 150 takes into account display requirements in effect for widgets when determining how widgets will be displayed given a set of calculations made by the calculation component 140 in any situation. Some content providers 160, 162, 164 and their available widgets may be queried as to the widgets' display preferences. Because some widgets may display a plurality of content using various colors and graphics that may display moving pictures or other active content, widgets may have preferred and even required methods of rendering. An electronic device 110 that is making contact with content providers 160, 162, 164 and requesting widgets to be downloaded and installed may query the content providers 160, 162, 164 and the widgets in which they are interested about how best to install and configure the widgets to get good performance results from the widgets.

In an embodiment, the widgets may provide an application programming interface (API) that may be invoked by the layout component 150 to determine how to lay out the widget display. For example, the layout component 150 may first invoke a first method provided by an application programming interface of a first widget associated with the highest current priority to determine how the first widget would like to be displayed. The first method may accept arguments or parameters to be provided by the layout component 150 describing an amount of display space or other display resources available. The first widget may respond to the first method invocation by returning a layout request such as 3 spaces by 3 spaces, for example where the display screen is portioned into a pane 5 spaces wide by 7 space high. The layout component 150, next, may invoke a second method provided by an application programming interface of a second widget associated with the second highest priority to determine how the second widget would like to be displayed. The second method may accept arguments or parameters to be provided describing the amount of display space or other display resources available. The second widget may respond to the second method invocation by returning a layout request such as 2 spaces by 1 space. The layout component 150, finally, may invoke a third method provided by an application programming interface of a third widget associated with the third highest priority to determine how the third widget would like to be displayed. The third method may accept arguments or parameters to be provided describing the amount of display space or other display resources available. The third widget may respond to the third method invocation by returning a layout request such as 1 space by 1 space. In other embodiments, other conventions for partitioning or allocating screen resources may be employed, for example a N pixel by M pixel designation or other spatial designation may be employed. The layout component 150 may then lay out the display screen of the three widgets substantially in accord with the layout requests returned by the three widgets.

Some electronic devices 110 may allow for content that cannot all fit into the primary viewing panel of a display of the electronic device 110 to be displayed in adjacent panels that may be accessible by scrolling to right or left or up or down. An electronic device 110 may display its content in a large virtual screen, larger than the actual physical display, the large virtual display accessible by scrolling about continuously from one area of the large virtual screen to another. Whether oversized content is displayed in a series of panels adjacent to the primary viewing panel of the display or is displayed in a large virtual screen accessible by continuous scrolling, the layout component 150 may insert indicators, pointers, minimized icons, or other markers that may assist in the accessing of widgets that may have been temporarily moved from the primary viewing panel of the electronic device 110. In an embodiment, a user may prescribe the initial positioning of widgets and may request that widgets remain in the same relative position regardless of alerts that may be in effect and how those alerts may affect the sizing of one or more widgets. Some widgets may be anchored to corners of the display. The widgets may remain anchored to their corners even when the widgets may be changed in size or appearance in response to heightened conditions.

In an embodiment, the electronic device 110 may not permit the movement of widgets beyond the viewing area of the display because of technical limitations. In another embodiment, widgets may technically be moved beyond the viewing area, but user requirements may specify that all widgets remain fully visible in the display. In these and other embodiments when widgets always stay completely inside the display, the layout component 150 may change or otherwise reduce the size or shape of widgets to accommodate these needs or requirements. Some widgets, by requirement or recommendation of a content provider 160, may display certain images at certain times. A widget that links to a content provider 160 of weather reporting may display an image of a bright sun, a tornado, or lightning bolt as appropriate. As a tornado moves closer to the location of the electronic device 110, the content provider 160 may send alerts of increasing urgency that cause the prioritization application 120 to expand the size of the widget, change the color of the widget, and/or cause the widget to begin flashing. In an embodiment, a widget providing weather information may expand to a size permitting it to display a map depicting the movement of a storm system across a geographic area. As the content provider 160 sends periodic updates, the map depicted in the widget displays the storm system as it progresses across the geographic area wherein the electronic device 110 is located or other area specified by the electronic device 110.

Content providers 160, 162, 164 send periodically updated content to electronic devices 110. In an embodiment, content providers 160 may be news services, sports information services, weather information providers, travel information providers, airlines, and other entities that issue information that is periodically changed and updated. Content providers 160 may originate the information they distribute, such as an airline might with its flight arrival times, or they may aggregate the information like a news broadcaster. Content providers 160 may provide weights to the items of information that they distribute or another entity may provide the weights. Content providers 160 may provide the widgets that electronic devices 110 download and install or they may provide their content to widgets created and distributed by other entities.

Service providers 170 provide wireless and other communications services that electronic device 110 may receive under subscription or other service plan. Electronic devices 110 may distribute the services of content providers 160, 162, 164 through their subscriptions with service providers 170. In an embodiment, a service provider 170 also may function in the role of a content provider 160 by distributing content it has purchased on a wholesale or other basis from a content provider 160. In this embodiment, the service provider 170 also may provide the event weights associated with specific items of content as they are received from content providers 160, 162, 164.

The consensus provider 180 may be a group of consumers of content distributed by content providers 160, 162, 164. The present disclosure teaches the inclusion of measures of collective interest in content in which the electronic device 110 may access using an installed widget. The collective interest may be taken as a passive measure of simple volume of readership or viewership of an item of content or it may be an active measure of how many electronic devices 110 respond to a survey about an item of content and the level of their interest in or opinion about the subject. Collective interest in an item of content may be measured in a plurality of manners. The level of collective interest may be given a weight in the same manner as an event weight is provided to a specific item of content by a content provider 160. In an embodiment, the weight provided an item of content by collective interest via the consensus provider 180 may be received by the prioritization application 120 and made part of the operations of the calculation component 140 in determining how the size or appearance of the appropriate widget should be changed. In an embodiment, in addition to the general priority weighting for the widget's subject matter and the event weighting provided by the content provider 160, the weight provided by the consensus provider 180 may be taken into account by the calculation component 140 in determining changes to widgets. In an embodiment, the weight provided by the consensus provider 180 may be substituted for the event weight provided by the content provider 160. In an embodiment, the calculation component 140 will use only the general priority weighting and the weight provided by the consensus provider 180 in determining changes to widgets. The consensus provider 180 may provide its weightings through a content provider 160 or it may provide its weightings directly to the electronic device 110 through the service provider 170.

The event reporting provider 190 is a primary source of information that may be provided in an electronic transmission to a widget. While their weightings of events may be valuable, content providers 160, 162, 164 and consensus providers 180 are in most cases observers of the events. In some cases, direct participants in the events may provide input and weights of the events or certain aspects of the events. A direct participant in a sporting event could provide a live rating of the level of competition from the field, the court, or the ice. A weather reporter situated in the intensity of a storm could provide a weight for the intensity of the weather crisis. A trader reporting from a trading floor and in the middle of intense transaction activity could submit a weighting for the high level of activity in the trading of a certain commodity or financial instrument. As with consensus providers 180, in an embodiment the weightings from event reporting providers 190 could be received and processed by the prioritization application 120 in addition to event weightings provided by a content provider 160. In another embodiment, the weighting received from event reporting providers 190 could also be used instead of weightings from a content provider 160. In an embodiment, the calculation component 140 will use only the general priority weighting and the weight provided by the event reporting providers 190 in determining changes to widgets. The event reporting providers 190 may provide its weightings through a content provider 160 or it may provide its weightings directly to the electronic device 110 through the service provider 170.

The wireless base station 192 may be any of a cellular wireless base station, for example a Code Division Multiple Access (CDMA), Global System for Mobile Communications (GSM), and/or Universal Mobile Telecommunications System (UMTS) cellular wireless base station; a World-wide Interoperable Microwave Access (WiMAX) base station; a WiFi access point; or other wireless access device.

The electronic device 110 is depicted in FIG. 1 as communicating wirelessly via the wireless base station 192 with the other components of the system 100. It is understood that in some embodiments the electronic device 110 may communicate with the other components of the system 100 using other communications technologies including wired links and the wireless base station 192 may not be used. While one of electronic device 110 and one base transceiver station 192 are illustrated in FIG. 1, it is understood that the system 100 may comprise any number of these devices.

The network 194 promotes communication between the components of the system 100. The network 194 may be any communication network including a public data network (PDN), a public switched telephone network (PSTN), a private network, and/or a combination thereof.

Figure 2:
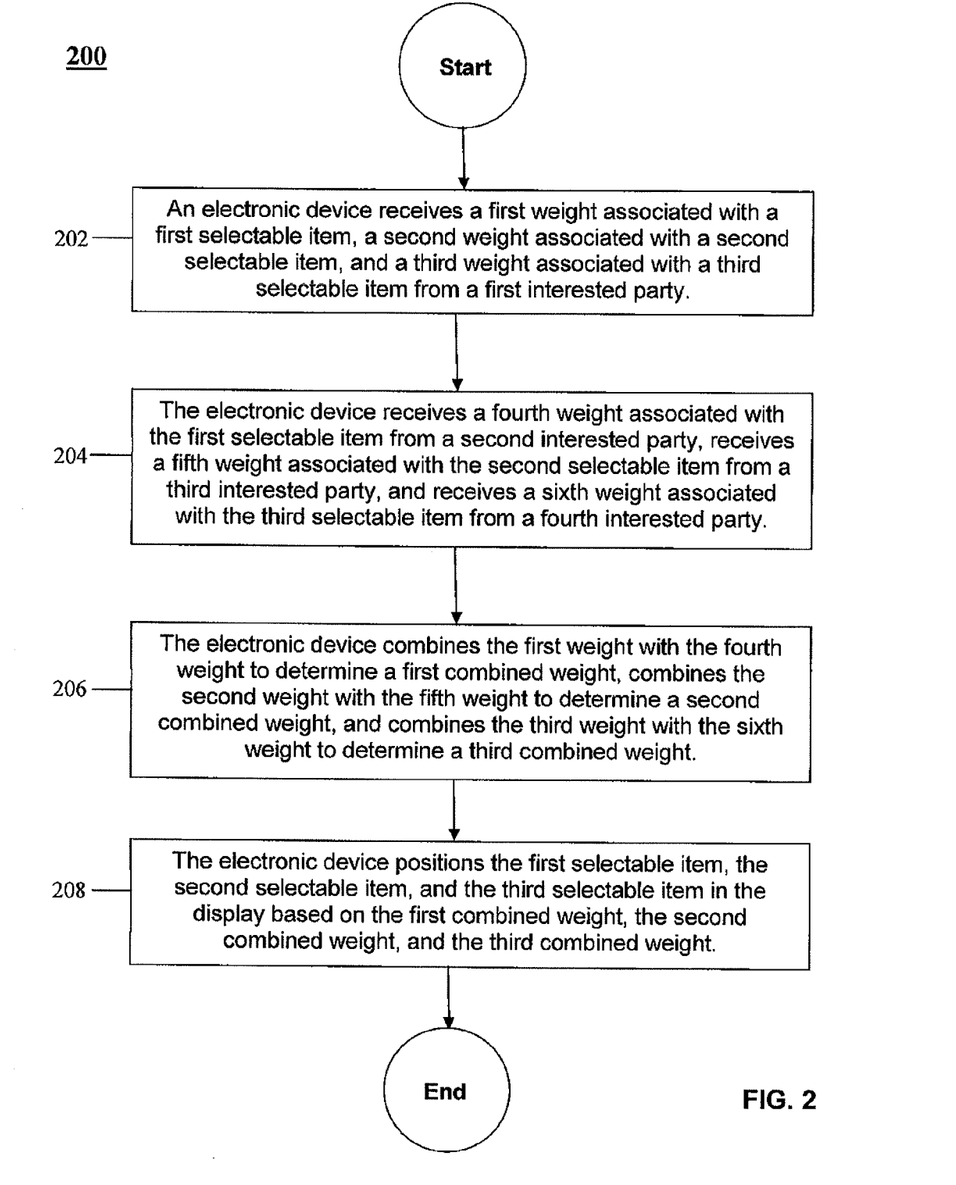
FIG. 2 is a flow chart illustrating a method according to an embodiment of the disclosure.

Turning now to FIG. 2, a method 200 of user interface screen presentation prioritization is provided. Beginning at block 202, the weighting component 130 receives and stores general priority weightings for widgets, or selectable items, that receive content. General priority weightings may be manually entered by a user into the electronic device 110. On a scale of ten, a first selectable item providing sports scores may receive a first weight of 8, a second selectable item providing stock market updates may receive a second weight of 4, and a third selectable item providing weather updates may receive a third weight of 7. The weights are measures of the relative importance to a user of the electronic device 110, or first interested party, of the subject matter provided by the selectable items. While the method 200 only discusses the use of a single set of weights for selectable items reporting sports scores, stock market updates, and weather information, in an embodiment, separate schedules of weights could be used during the day versus during the evening and during the workweek versus during the weekend, depending on the type of events taking place during those times as well as the physical location of the electronic device 110.

At block 204, the weighting component 130 receives and saves event weights from content providers 160, 162, 164 for each of the three selectable items described at block 202. In the method 200, the content providers 160, 162, 164 correspond to a second interested party, a third interested party, and a fourth interested party, respectively. The second interested party may be a provider of sports score information, the third interested party may be a provider of stock market updates, and the fourth interested party may be a provider of weather updates. The weighting component 130 receives a fourth weight associated with the first selectable item from the second interested party, receives a fifth weight associated with the second selectable item from third interested party, and receiving a sixth weight associated with the third selectable item from the fourth interested party. During times when conditions are normal and no heightened conditions are in effect, the weighting component 130 may regularly receive the same set of event weights from one hour to the next or whatever the regular interval may be for receiving the weights from the second interested party, the third interested party, and the fourth interested party. When one or more of the second, third, and fourth interested parties are providing information associated with heightened conditions, event weights may be received from the particular interested party more frequently.

At block 206, the calculation component 140 combines the general priority weightings, or first, second, and third weights, assigned by the first interested party for each of the three selectable items described at block 202 with the event weights, or fourth, fifth, and sixth weights received at block 204 associated with each respective selectable item. The calculation component 140 combines the first weight with the fourth weight to determine a first combined weight, combines the second weight with the fifth weight to determine a second combined weight, and combines the third weight with the sixth weight to determine a third combined weight. The first combined weight, second combined weight, and the third combined weight are total weights currently associated with the first selectable item, the second selectable item, and the third selectable item, respectively, that in the example are widgets providing content on sports scores, stock market updates, and weather information, respectively. These combinations may be as simple as calculating an arithmetic product of the two weights for each selectable item or it may involve processing each pair of weights through an algorithm or other mathematic or analytic process.

At block 208, the layout component 150 positions the first selectable item, the second selectable item, and the third selectable item in the display based on the calculations made at block 206 by the calculation component 140. The layout component 150 positions the first selectable item, the second selectable item, and the third selectable item in the display based on the first combined weight, the second combined weight, and the third combined weight. Under normal circumstances, when none of the selectable items is receiving a fourth, fifth, or sixth weight from its corresponding second interested party, third interested party, or fourth interested party that indicate a heightened condition, the layout component 150 may display the selectable items according to the priority and placement preferences originally chosen by the first interested party and entered into the electronic device 110. In an embodiment, changing the size of the selectable items, maintaining the relative position of the selectable items, and multi-dimensional and/or multi-party weighting of the priority of the selectable items may each provide value independently of each other.

When a content provider 160 generates an event weight that indicates a heightened condition, the weighting component 130 receives the new event weight and the calculation component 140 matches the newly received event weight with the general priority weighting assigned to the widget linking to the content provider 160 associated with the widget. The calculation component 140 enters the two measures into its algorithm along with the existing event weights and general priority weightings for the other widgets that are not in heightened conditions. The layout component 150 determines the size to which the affected widget should be expanded given the severity level of the alert and any sizing limitations on the widget. The layout component 150 also determines the locations in the display to which the other widgets should be moved and any resizing of the other widgets. If the expansion of the widget that received the alert makes it necessary that other widgets be partially or completely moved out of the primary viewing area of the electronic device 110, indicators will be placed that assist in the accessing of those moved widgets.

In an embodiment, the event weightings provided by the consensus provider 180 and/or the event reporting provider 190 may be received by the weighting component 130 and taken into the calculations by the calculation component 140. The present disclosure teaches combining the general priority weighting for a widget with any one or more of event weightings received from a content provider 160, a consensus provider 180, and an event reporting provider 190. The calculation component 140 has the capability to take into account event weightings received on alert conditions from any one or any combination of these three providers of input. Algorithms used by the calculation component 140 may not treat weights received from each of a content provider 160, a consensus provider 180, and an event reporting provider 190 in the same way depending on the circumstances of the event involved as well as the importance placed on the weighting received from each. Regardless of which one of or what combination of a content provider 160, a consensus provider 180, and an event reporting provider 190 provides weights to the prioritization application 120 to be combined with the general priority weighting for a given widget, when the calculation component 140 has completed its operations on the weights provided for a particular event, the layout component 150 then sizes, shapes, and places the widgets in the display of the electronic device 110 for viewing and access.

Figure 3:
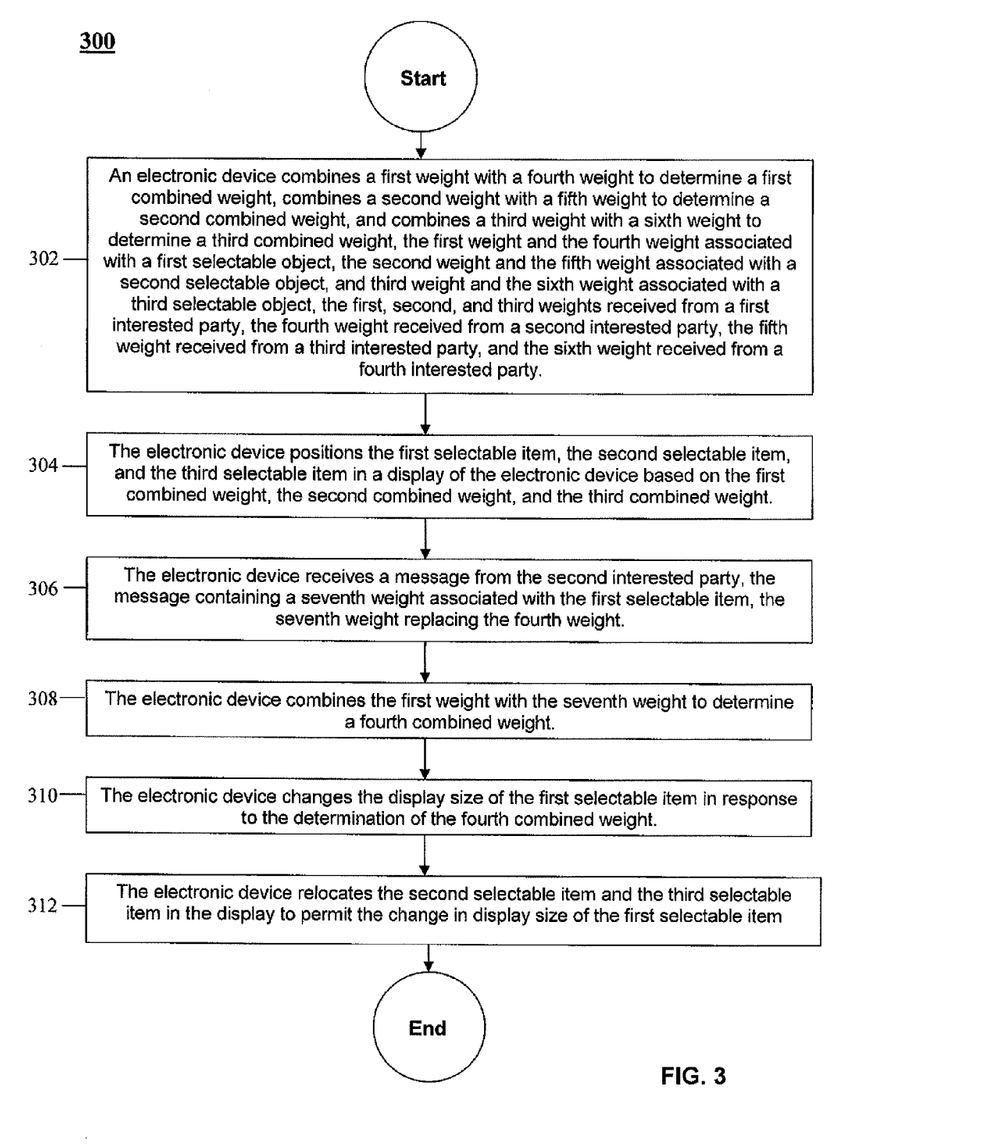
FIG. 3 is a flow chart illustrating another method according to an embodiment of the disclosure.

Turning now to FIG. 3, a processor-implemented method 300 of user interface screen presentation prioritization is provided. Blocks 302 and 304 are similar to the method 200. At block 302, general priority weightings applied to three widgets are combined with event weights received from content providers 160, 162, 164 associated with the widgets. The three widgets may deliver updates on sports scores, stock market updates, and weather information and the general priority weightings provide indication of the general level of interest in these subject areas. The general priority weightings may have been manually entered into the electronic device 110. By combining the general priority weightings for the sports score, stock market update, and weather information widgets with the event weightings currently in effect for those widgets received from their content providers 160, 162, 164, respectively, the calculation component 140 may determine a first combined weight, a second combined weight, and a third combined weight for those widgets, respectively.

At block 304, the calculation component 140 and the layout component 150 position the three widgets based on the first combined weight, the second combined weight, and the third combined weight. In an embodiment, the layout component 150 may have instructions to place the sports score widget in the upper left corner of the display, place the stock market update widget in the upper right corner of the display, and place the weather information widget in the center left portion of the display.

At block 306, the electronic device 110 receives a message from the content provider 160, the message containing a new event weight associated with the sports score widget. The new event weight for the sports score widget replaces the previous event weight for the sports score widget. In an embodiment, the content provider 160 may have received news that the score of a sports competition of interest has changed or the competition has ended and a final score is available. The new event weight sent by the content provider 160 associated with this change is intended to be taken as a heightened condition and displayed on the electronic device 110 in a manner that attracts attention.

At block 308, the calculation component 140 calculates a new combined weight for the sports score widget using the previously received general priority weighting for the widget with the newly received event weight associated with the heightened condition. In an embodiment, the new combined weight may be referred to as a fourth combined weight, the fourth weight replacing the first combined weight calculated earlier when the sports score widget was not in a heightened state.

At block 310, the layout component 150, acting on the calculations made by the calculation component 140 at block 308, changes the display size of the widget associated with sports scores. In an embodiment, the layout component 150 may alternatively or in addition change the color of the widget or cause the widget to begin flashing or pulsating. In an embodiment, the widget may display a different image. When a storm approaches the vicinity of the electronic device 110, for example, a widget that displays content received from a content provider 164 that provides weather information may begin displaying a cloud or lightning bolt, for example.

At block 312, the prioritization application 120 relocates the widgets that display stock market updates and weather information to allow for the change in display size of the widget associated with sports scores that is in a temporary heightened state as described at block 306. The positions of the widgets that display stock market updates and weather information remain the same relative to the widget displaying sports scores but because the widget displaying sports scores is temporarily expanded, for example, it may be necessary to move the widgets that display stock market updates and weather information. In moving the stock market and weather information widgets to permit the sports score widget to expand but to also maintain all of the widgets' relative positions to each other, it may be necessary to move a portion of or all of the stock market and weather information widgets to panels adjacent the viewing display of the electronic device 110. If the electronic device 110 uses a single large continuous viewing screen that can be viewed by continuous scrolling about, the stock market and weather information widgets may have been moved into those other areas of the large continuous screen. Whatever the display method used by the electronic device 110, when widgets have been moved partially or completely from the primary viewing area of the display, arrows, small icons, or other indicators may be placed to assist in accessing the moved widgets.

When one or more widgets are moved to other areas of the display to allow for size changes in the heightened state of one or more widgets, the widgets may remain in the same position in the display relative to the widget(s) in heightened state. The relative position of the widgets is established by the user of the electronic device 110 and may not frequently change. When one widget expands in size, the other widgets may move but their position relative to each other may not change and instead stays as configured by the user of the electronic device 110. When one or more widgets in heightened state expands to a size large enough that the other widgets, in order to maintain their relative positions, must move partially or completely off the primary viewing area of the electronic device 110, the icons, arrows or other symbols indicate the direction in which the shifted widgets have moved. Maintaining the same relative positioning of widgets when one or more widgets enter a heightened state and are expanded may enable more rapid location of moved widgets.

Figure 4:
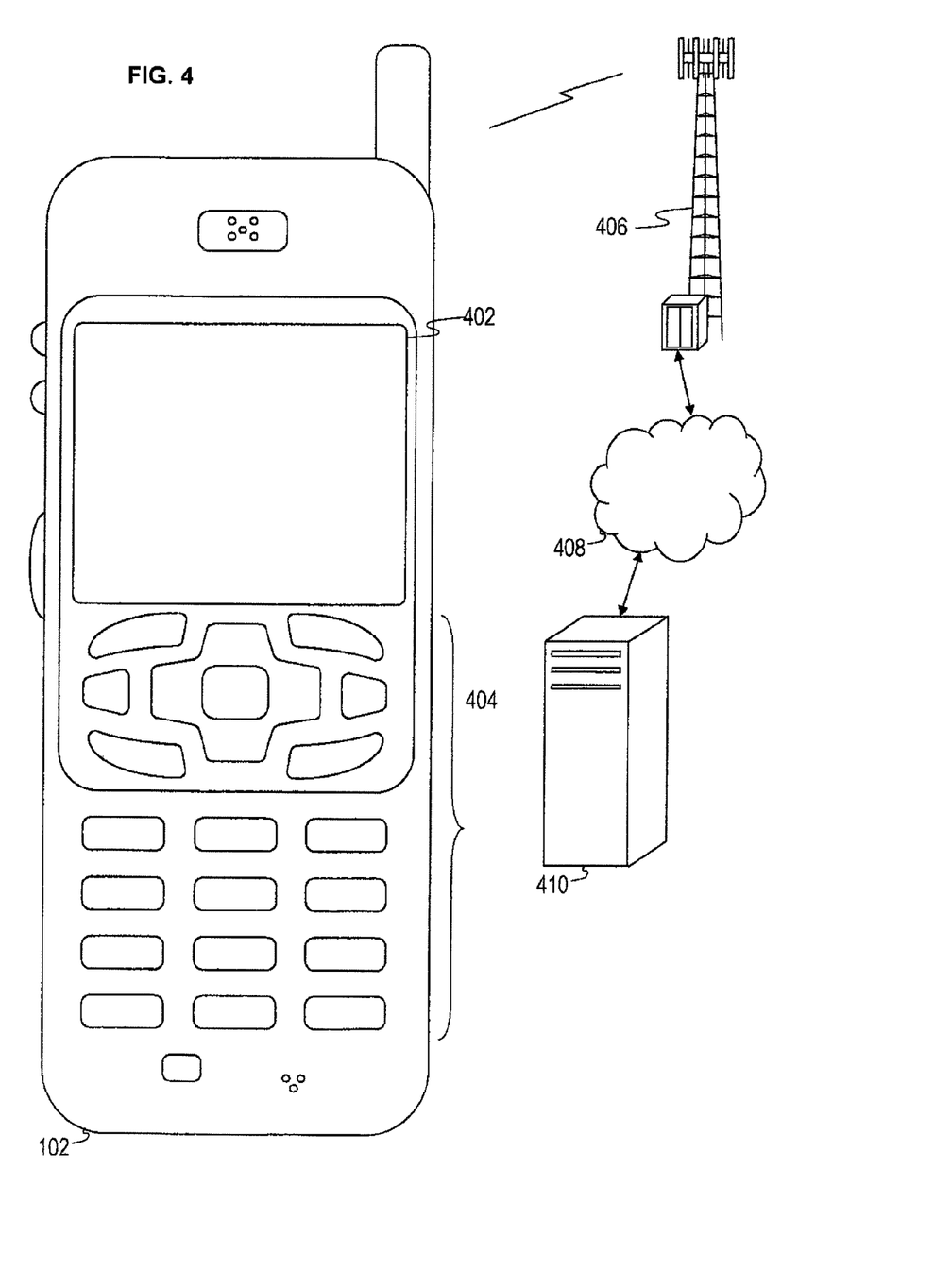
FIG. 4 is an illustration of a mobile device according to an embodiment of the disclosure.

FIG. 4 shows a wireless communications system including the mobile device 102. The mobile device 102 may in some embodiments exemplify the electronic device 110. FIG. 4 depicts the mobile device 102, which is operable for implementing aspects of the present disclosure, but the present disclosure should not be limited to these implementations. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application 608 which enables the display 402 to show a web page. The web page may be obtained via wireless communications with a base transceiver station (BTS) 406, a wireless network access node, a peer mobile device 102 or any other wireless communication network or system. While a single base transceiver station 406 is illustrated, it is understood that the wireless communication system may comprise additional base transceiver stations. In some instances, the mobile device 102 may be in communication with multiple base transceiver stations 406 at the same time. The base transceiver station 406 (or wireless network access node) is coupled to a wired network 408, such as the Internet. Via the wireless link and the wired network, the mobile device 102 has access to information on various servers, such as a server 410. The server 410 may provide content that may be shown on the display 402. Alternately, the mobile device 102 may access the base transceiver station 406 through a peer mobile device 102 acting as an intermediary, in a relay type or hop type of connection.

Figure 5:
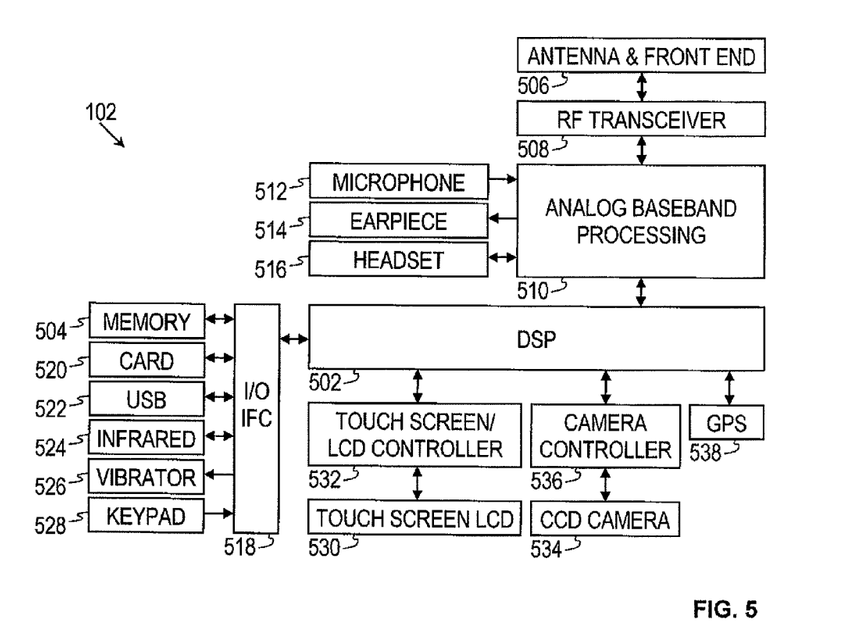
FIG. 5 is a block diagram of a mobile device according to an embodiment of the disclosure.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 408, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 6:
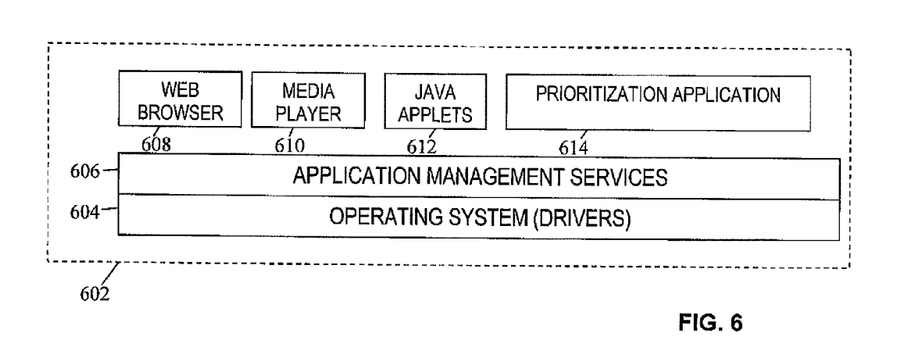
FIG. 6 is a block diagram of a software configuration for a mobile device according to an embodiment of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile device 102. Also shown in FIG. 6 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality. The prioritization application 614 may be an exemplary embodiment of the prioritization application 120 described in the system 100.

Figure 7:
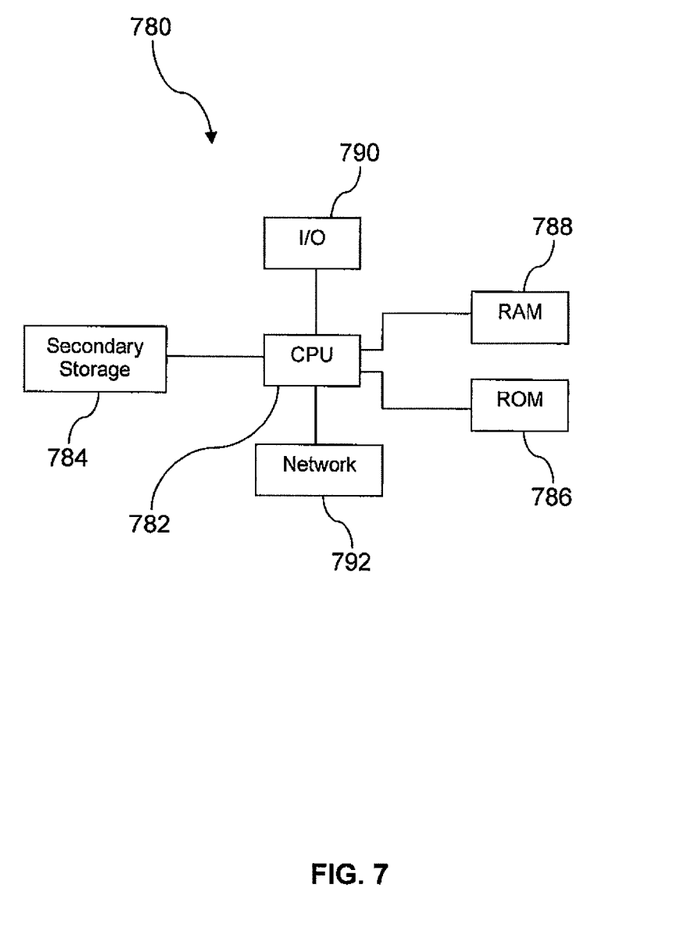
FIG. 7 illustrates an exemplary computer system suitable for implementing some aspects of the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A processor-implemented method of user interface screen presentation prioritization, comprising:

receiving, by a weighting component stored on and executed by an electronic device comprising a display, from a user interface of the electronic device, a first general weight associated with a first selectable item, a second general weight associated with a second selectable item, and a third general weight associated with a third selectable item from an interested party, wherein the interested party is a user of the electronic device, and wherein the display presents a plurality of selectable items including the first selectable item, the second selectable item, and the third selectable item;

receiving, by the weighting component, from a first content provider, a first event weight for a first event content provided by the first content provider and associated with the first selectable item;

receiving, by the weighting component, from a second content provider, a second event weight for a second event content provided by the second content provider and associated with the second selectable item;

receiving, by the weighting component, from a third content provider, a third event weight for a third event content provided by the third content provider and associated with the third selectable item;

combining, by a calculation component stored on and executed by the electronic device, the first general weight with the first event weight to determine a first combined weight for the first selectable item;

combining, by the calculation component, the second general weight with the second event weight to determine a second combined weight for the second selectable item;

combining, by the calculation component, the third general weight with the third event weight to determine a third combined weight for the third selectable item;

receiving, by a layout component stored on and executed by the electronic device, the first combined weight, the second combined weight, and the third combined weight;

determining, by the layout component, a modification to one or more of the first selectable item, the second selectable item, and the third selectable item in the display based on the received first combined weight, second combined weight, and third combined weight; and based on the determination, modifying, by the layout component, the one or more of the first selectable item, the second selectable item, and the third selectable item in the display, wherein the modification to the one or more of the first selectable item, the second selectable item, and the third selectable item comprises a change to at least one of a position, a color, a size, or a brightness of the one or more of the first selectable item, the second selectable item, and the third selectable item in the display.

2. The method of claim 1, further comprising:

receiving, by the weighting component, from the first content provider, a fourth event weight for a fourth event content provided by the first content provider and associated with the first selectable item, the fourth event weight replacing the first event weight;

combining, by the calculation component, the fourth event weight with the first general weight to determine a fourth combined weight, the fourth combined weight replacing the first combined weight; and relocating, by the layout component, the first selectable item, the second selectable item, and the third selectable item in the display based on the fourth combined weight, the second combined weight, and the third combined weight.

3. The method of claim 1, wherein the first general weight, the second general weight, and the third general weight represent rankings by the interested party of the importance of the subject matter area associated with the first selectable item, the second selectable item, and the third selectable item, respectively.

4. The method of claim 2, wherein the first event weight and the fourth event weight represent rankings of events associated with the first selectable item by the first content provider, the second event weight represents rankings of events associated with the second selectable item by the second content provider, and the third event weight represents rankings of events associated with the third selectable item by the third content provider.

5. The method of claim 2, further comprising:

receiving, by the weighting component, from a fourth content provider a fifth event weight for a fifth event content provided by the fourth content provider and associated with the first selectable item; and combining, by the calculation component, the fifth event weight, the fourth event weight, and the first general weight to determine a fifth combined weight.

6. The method of claim 5, further comprising relocating, by the layout component, the first selectable item, the second selectable item, and the third selectable item based on the fifth combined weight, the second combined weight, and the third combined weight.

7. A processor-implemented method of user interface screen presentation prioritization, comprising:

receiving, by a weighting component stored on and executed by an electronic device comprising a display, from a user interface, a first general weight associated with a first selectable item, a second general weight associated with a second selectable item, and a third general weight associated with a third selectable item from an interested party, wherein the interested party is a user of the electronic device, and wherein the display presents a plurality of selectable items including the first selectable item, the second selectable item, and the third selectable item;

receiving, by the weighting component, from a first content provider, a first event weight for a first event content provided by the first content provider and associated with the first selectable item;

receiving, by the weighting component, from a second content provider, a second event weight for a second event content provided by the second content provider and associated with the second selectable item;

receiving, by the weighting component, from a third content provider, a third event weight for a third event content provided by the third content provider and associated with the third selectable item;

combining, by a calculation component stored on and executed by an electronic device comprising a display, the first general weight with the first event weight to determine a first combined weight for the first selectable item in the display, the second general with the second event weight to determine a second item weight for the second selectable item in the display, and the third general weight with the third event weight to determine a third combined weight for the third selectable item in the display;

receiving, by a layout component stored on and executed by the electronic device, the first combined weight, the second combined weight, and the third combined weight;

determining, by the layout component, a modification to one or more of the first selectable item, the second selectable item, and the third selectable item in the display based on the received first combined weight, second combined weight, and third combined weight;

based on the determination, modifying, by the layout component, the one or more of the first selectable item, the second selectable item, and the third selectable item in the display of the electronic device, wherein the modification to the one or more of the first selectable item, the second selectable item, and the third selectable item comprises a change to at least one of a position, a color, a size, or a brightness of the one or more of the first selectable item, the second selectable item, and the third selectable item in the display;

receiving, by the weighting component, a message from the second interested party, the message containing a fourth event weight for a fourth content being provided to the first selectable item, wherein the fourth event weight replaces the first event weight;

combining, by the calculation component, the first general weight with the fourth event weight to determine a fourth combined weight for the first selectable item;

changing, by the layout component, the display size of the first selectable item in response to the determination of the fourth combined weight; and relocating, by the layout component, the second selectable item and the third selectable item in the display to permit the change in the display size of the first selectable item.

8. The method of claim 7, wherein relocating the second selectable item and the third selectable item causes the second selectable item and the third selectable item to be changed in size, and wherein the first selectable item, the second selectable item, and the third selectable item remain entirely visible within the display of the electronic device.

9. The method of claim 7, wherein relocating the second selectable item and the third selectable item causes at least one of a portion and the entirety of at least one of the second selectable item and the third selectable item to extend beyond a boundary of the display and become not visible.

10. The method of claim 7, wherein relocating the second selectable item and the third selectable item causes at least one of a portion and the entirety of at least one of the second selectable item and the third selectable item to extend beyond a boundary of the display and with the at least one of the portion and the entirety of at least one of the second selectable item and the third selectable item becoming visible in adjacent viewing panels accessible using controls provided by the electronic device.

11. The method of claim 7, further comprising displaying, by the electronic device, the first selectable item and at least one of additionally changing color of the first selectable item, changing brightness of the first selectable item, flashing of the first selectable item, and pulsating of the first selectable item to indicate changes in priority weightings.

12. The method of claim 7, wherein, after the layout component relocates the second selectable item and the third selectable item in the display to permit the change in display size of the first selectable item, the positions of the second selectable item and the third selectable item relative to the first selectable item remain the same as prior to the relocations.

13. The method of claim 4, further comprising discarding, by the calculation component, the first event weight, the second event weight, the third event weight, and the fourth event weight when the weights are no longer in effect.

14. The method of claim 1, wherein the first selectable item, the second selectable item, and the third selectable items are widgets.

15. The method of claim 14, wherein at least one of the widgets comprises an interactive software application installed on the electronic device, and wherein the at least one of the widgets comprises an interface is configured to receive content from a content source external to the electronic device.

16. The method of claim 15, wherein the at least one of the widgets provides an application programming interface (API) comprising a method that identifies a preferred layout request for displaying the at least one of the widgets, and wherein the positioning of the at least one of the widgets by the layout component is based at least in part on invoking the method of the application programming interface of the at least one of the widgets.

17. The method of claim 16, wherein the method of the application programming interface is invoked with one of arguments or parameters that describe available display resources of the electronic device.

18. The method of claim 1, wherein the first general weight, the second general weight, and the third general weight are associated with a first time of day, wherein the layout component positions the first selectable item, the second selectable item, and the third selectable item in the display based on the first combined weight, the second combined weight, and the third combined weight during the first time of day, and wherein the method further comprises:

receiving, by the weighting component, from the interested party via the user interface of the electronic device, a fourth general weight associated with the first selectable item, a fifth general weight associated with the second selectable item, and a sixth general weight associated with the third selectable item, wherein the fourth general weight, the fifth general weight, and the sixth general weight are associated with a second time of day;

combining, by the calculation component, the fourth general weight with the first event weight to determine a fourth combined weight for the first selectable item;

combining, by the calculation component, the fifth general weight with the second event weight to determine a fifth combined weight for the second selectable item; and combining, by the calculation component, the sixth general weight with the third event weight to determine a sixth combined weight for the third selectable item; and positioning, by the layout component, the first selectable item, the second selectable item, and the third selectable item in the display based on the fourth combined weight, the fifth combined weight, and the sixth combined weight during the second time of day.

19. The method of claim 18, wherein the first time of day is a day time and the second time of day is an evening time.

20. The method of claim 18, wherein the first time of day is a weekday and the second time of day is a weekend.

\* \* \* \* \*